United States Patent [19]

Bass et al.

[11] Patent Number: 4,672,571
[45] Date of Patent: Jun. 9, 1987

[54] COMPOUND WORD SUITABILITY FOR SPELLING VERIFICATION

[75] Inventors: Vance R. Bass, Austin; Veronica A. Bonebrake, Leander; David A. Garrison; James K. Landis, both of Austin, all of Tex.; Mary S. Neff, Montrose, N.Y.; Robert J. Urquhart; Susan C. Williams, both of Austin, Tex.

[73] Assignee: International Business Machines Corporation, Armonk, N.Y.

[21] Appl. No.: 664,184

[22] Filed: Oct. 24, 1984

[51] Int. Cl.⁴ .............................................. G06F 7/22
[52] U.S. Cl. .................................. 364/900; 364/419; 400/63
[58] Field of Search ............... 364/200, 300, 900, 419; 400/63

[56] References Cited

U.S. PATENT DOCUMENTS

| | | | |
|---|---|---|---|
| 4,342,085 | 7/1982 | Glickman et al. | 364/300 |
| 4,453,217 | 6/1984 | Boivie | 364/300 |
| 4,471,459 | 9/1984 | Dickinson et al. | 364/900 |

OTHER PUBLICATIONS

Peterson, "Computer Programs for Detecting and Correcting Spelling Errors", *Communications of the ACM*, Dec. 1980, vol. 23, No. 12.

Primary Examiner—Archie E. Williams
Assistant Examiner—Michael J. Ure
Attorney, Agent, or Firm—Douglas H. Lefeve

[57] ABSTRACT

A compound word spelling verification technique is described for use with a dictionary which does not include all verifiable compounds. During verification of a text word, an attempt is made to find a pair of words in the dictionary of which the text word consists. A table associated with the dictionary includes compound class information relative to each of the words stored therein. The compound class of each of the pair of words of which the input text word consists are tested for compatibility to determine if each of the pair of words may acceptably be used in a compound word in the physical position in which it' is found in the input text word.

9 Claims, 2 Drawing Figures

COMPOUND WORD SUITABILITY FOR SPELLING VERIFICATION

CROSS-REFERENCE TO RELATED APPLICATION

U.S. patent application Ser. No. 06/664,183, to V. R. Bass et al, filed Oct. 24, 1984, entitled "Compound Word Spelling Verification", and assigned to the assignee of this invention.

TECHNICAL FIELD

This invention relates to spelling verification in general, and more particularly to spelling verification of compound words by reference to a data base which does not include all verifiable compounds.

BACKGROUND ART

When the spelling of compound words has been automatically verified by word processing systems, one of two techniques has been utilized. With one prior art technique, all compound words that the system is capable of verifying as correctly spelled are stored in a dictionary data base. The word to be verified (sometimes referred to as the input word) is compared against all words stored in the dictionary for a possible match. Utilizing the second prior art technique, the input word is parsed, or separated, into its constituent words. The constituent words are then used as input words to be compared against the words stored in the dictionary data base.

One of the obvious limitations of the first of the two prior art techniques described above is that of the memory size or storage space required to store a dictionary data base large enough to include all foreseeable compounds of words. In many languages, particularly in Germanic languages, word compounding is an active way of creating new words in these languages; therefore, storing *all* meaningful compounds in a dictionary data base is, quite simply, impossible.

Accordingly, the second prior art technique described above is the only meaningful way to achieve the greatest compound word verification potential, although the approach of parsing compounds into their constituent parts and verifying these parts has had several significant limitations in its operation.

One example of this parsing technology is found in the IBM Displaywriter TextPack 4 program which runs on the IBM Displaywriter System. With this spelling verification system, certain letter pairs were known to be most frequent at the "joint" between compound constituents, and these letter pairs could be used as clues to scanning a word for possible breaking points. For example, many English words end in the letter "t" and many words begin with the letter "s". Thus, the pair "ts" is a good candidate for a break point for parsing English compound words. The word in question is scanned and broken between each set of possible break points found in the word. Each resultant piece of the word is then compared to the words in the dictionary data base. Therefore, in attempting to verify the word "hotspot" as a correctly spelled word, the parser would find the "ts" break point, break the word in to "hot" and "spot" and would then find both of these parts in the dictionary. The word would then be judged correctly spelled, and on this basis could also be hyphenated between the constituents, e.g.—"hot-spot".

The problems of the approach described immediately above lie in the fact that likely break points are also common letter pairs at places other than the joints between compound constituents. This fact causes a number of serious flaws in the operation of such a method. In terms of system performance, since any unrecognized word must be parsed before it can be marked as misspelled, the parser must have a large number of break points in order to verify correct compounds. Thus, the identification of incorrect words is slowed down correspondingly, which degrades the performance of the system. Since compounding languages have longer average word lengths than non-compounding languages, the wasted time and effort expended in trying all of the "possible" combinations (according to an extensive break point list) can be considerable. For example, a comparable process in the English language might produce a word like "compoundwordspellingverification". The number of operations required to break a compound word of this length at all possible break points, look up the resultant constituents, and possibly apply another level of parsing to one of the pieces is clearly quite large.

A further flaw in a break point parsing technique is that not all misspelled words will be correctly identified as such because compounds composed of two unrelated but correctly spelled words which may be parsed into two correct words are verified as correctly spelled words. For example, a misspelling of "overtime" as "evertime" would not be caught by a break point parser, since "ever" and "time" are both correctly spelled words. Likewise, run-on words such as "suchas" will be verified as "correct"compounds. This is a particularly serious drawback, since the user trusts that the system will find these types of typographical errors and misspellings. This particular problem relates to the detection of errors. For the purposes of this application, an error is defined as a misspelling which is not caught by the system, and therefore, verified as a correct spelling.

In contrast, false alarms are defined as correctly spelled words which are not recognized by the spelling checker and are, therefore, flagged as misspelled words. The break point parsing technique described above sometimes becomes "confused" when several letters in the first part of a compound look like another good word. If the remainder of the compound cannot be found and the parsing algorithm does not successfully recover, a perfectly good word may be marked as misspelled, even though its constituents are in the dictionary.

A further limitation of the break point parsing technique described above involves hyphenation errors. If the parser is contributing information to an automatic hyphenation program, correctly spelled words may suffer from mishyphenation on the basis of break points when the wrong pair of words is identified as the constituents of the compound. For example, "snakeskin" might be incorrectly parsed as "snakes-kin", or "pantscuff" might be incorrectly parsed as "pant-scuff". This turns the word to apparent nonsense for a reader who tries to reconstruct it on the basis of its supposed hyphenation at the compound joint.

Another limitation with break point parsing is that certain words have forms which are used only when the word is combined with others in compounds. These combining forms are not considered meaningful when they are found outside of a compound. A common example is the German word "Schule" (school), whose combining form is "Schul-", as in "Schulkinder" (school children). An example in English is "-hearted", as in "good-hearted". In order to verify words made with these combining forms, previous systems have had to either include all possible words made from the combining forms, or include the combining form in the dictionary along with ordinary words. This opens up the possibility of these forms being verified as good words when not combined, or when in morphologically incorrect combinations (e.g. "Hochschul" instead of the correct "Hochschule").

Accordingly, although it is preferred to use a parsing technique to verify compounds for spelling verification, rather than attempting to store all meaningful compounds in a dictionary (which is clearly impossible), it would be of great benefit to have available a high performance parsing algorithm which minimizes errors, false alarms, and a verification of improperly combined forms when verifying compound words.

DISCLOSURE OF THE INVENTION

Accordingly, a technique is employed in parsing compound words in which the input word is matched against dictionary words to determine if substrings of the input word match with words in the dictionary. For the purposes of this description, unless otherwise specified, "substring" refers to an initial substring, meaning a sequence of text characters beginning with the first character of the input word and ending prior to the end of the input word. The remainder of the input word, beginning with the next character beyond the last character of the longest matching substring, is then compared with the dictionary. If it is not in the dictionary, the system recalls the next-longest substring and the remainder of the input word beyond this next-longest substring is tested for a match with the dictionary words.

In practice, for compound words the combination of the longest substring and the remainder of characters beyond the longest substring constitutes two words in the great majority of cases. This dramatically improves system performance by reducing the number of dictionary look-ups and also substantially lessens the number of verification and hyphenation errors. The modification of this technique which employs backing up from the longest substring to successively shorter substrings when the remainders are not found in the dictionary addresses those cases in which the combination of the longest substring and remainder do not verify as a compound word. Furthermore, this approach may be applied recursively to the remainder of the word in order to verify the spelling of words with more than two constituents.

Additionally, the novel parsing technique of this invention is applicable to any of the languages which form new vocabulary items by combining shorter words in a rule-governed manner by including a measure of artificial intelligence to enable the parsing system to distinguish whether two supposed, correctly spelled compound constituents are positionally compatible, or whether they are one of the spurious cases described above in which two words, otherwise correctly spelled, are improperly combined into a compound (e.g., "throughchair"). This artificial intelligence is added to the system by use of flags stored with the words in the dictionary data base which indicate the manner in which the word may participate in compounding, if at all. When the parser breaks a candidate word into two correctly spelled constituent words, their compounding features are examined to determine whether they form an acceptable combination. If the features do not match, the word is marked as a misspelling, even though both parts were found in the dictionary.

The foregoing and other objects, features, extensions, and advantages of the invention will be apparent from the following more particular description of preferred embodiments of the invention, as illustrated in the accompanying drawing.

BEST MODE FOR CARRYING OUT THE INVENTION

Figure 1:
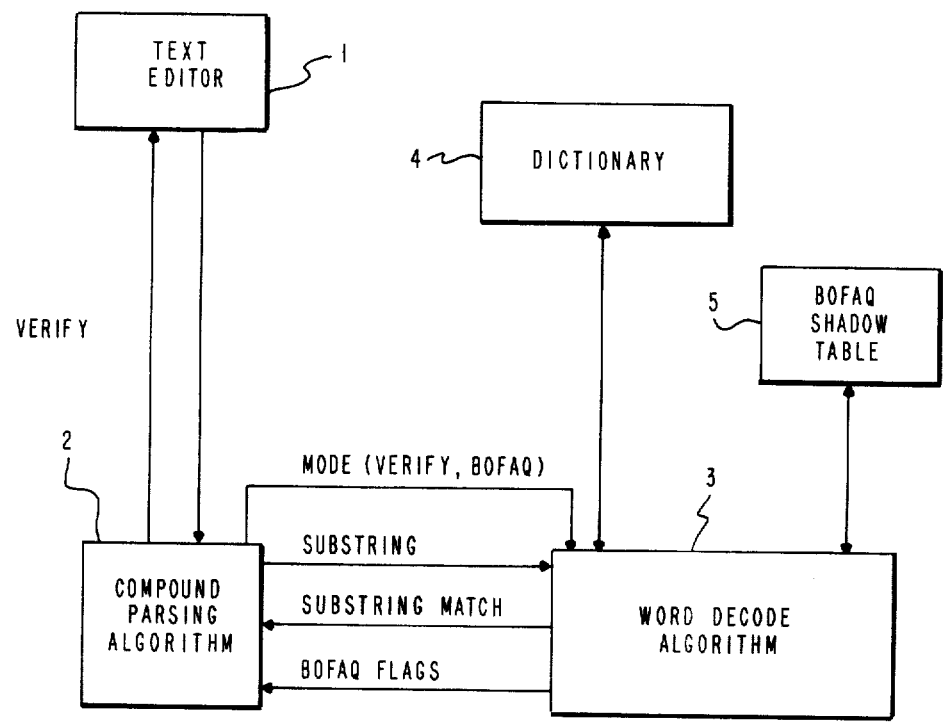
FIG. 1 is a block diagram of the data flow of the compound word spelling verification technique of this invention.

Referring to FIG. 1, a block diagram is shown of the data flow of the compound word spelling verification technique of this invention. This invention is used with a Text Editor 1 which may, for example, be an IBM Personal Computer running an IBM DisplayWrite 2 program to enable the IBM Personal Computer to perform a variety of word processing tasks and applications. A popular one of these word processing applications is "Spelling Tasks" which can be used to verify the spelling of words in a document. With this kind of word processing application, the words in a document are compared with the contents of a stored dictionary data base so that words can be highlighted which do not appear to be correctly spelled. Of course, many proper names and some other words are not ordinarily found in the dictionary, but one important operational goal is to have the system highlight as few correctly spelled words as possible.

If the compound word spelling verification technique of this invention were used in the "Spelling Tasks" application of a text editing system, the text editor program sends individual words to be verified to the Compound Parsing Algorithm 2. The word sent from the Text Editor 1 to the Compound Parsing Algorithm 2 for verification is conveyed along the Word or Substring line to the Word Decode Algorithm 3 for comparison with words stored in Dictionary 4. A logical point in the dictionary will be chosen to begin comparisons of the Dictionary 4 words with the word to be verified, as will be understood by those skilled in the art. For example, rather than starting at the beginning of the dictionary for each verification operation, the comparison process in the Dictionary 4 would begin with the words stored therein which begin with the same letter as the word to be verified. Further, performance considerations might dictate that the comparison process begin two or three characters into the word to be verified. In any case, one or more whole words may be found in Dictionary 4 which compare to the larger sequence of characters comprising the text word to be verified. Each of these whole words in the Dictionary 4 which compare with a portion beginning with the first letter of the input word will hereinafter be referred to as substrings.

For example, in attempting to verify the word "snakeskin", the substring "snake" will first be found, and the word "snakes" will also be found in Dictionary 4. Similarly, in verifying "pantscuff", the substring "pant" will first be found followed by the substring "pants". The Word Decode Algorithm 3 conveys each of the substrings which match to the Compound Parsing Algorithm 2.

With the technique of this invention, the remainder of the word following the longest substring is then conveyed back to the Word Decode Algorithm 3 for comparing to the words in Dictionary 4. Continuing with the "pantscuff" example, "cuff" is sent back to the Word Decode Algorithm for comparison with the words in Dictionary 4. In this comparison, the words in the Dictionary 4 beginning with c (and possibly those beginning with cu) are accessed to determine if a comparison exists between the "remainder" substring in the word to be verified and the words in Dictionary 4. In this example, "cuff" will be found in the Dictionary 4 and this fact will be conveyed along the Substring Match line from Word Decode Algorithm 3 to the Compounding Parsing Algorithm 4.

A Shadow Table 5 stores data associated with each of the words in Dictionary 4. Although this Shadow Table 5 is shown in FIG. 1 as a separate entity, it will be obvious to those skilled in the art that Shadow Table 5 can exist as a partitioned area of the memory which stores Dictionary 4. Alternatively, the information stored in Shadow Table 5 can, instead of being stored separately, be stored along with the words in Dictionary 4. This information stored relative to the words in Dictionary 4 denotes the suitability for and circumstances under which the words in Dictionary 4 may be compounded, if compounding is allowable at all. In the example above relative to "pantscuff", the information relative thereto in the Shadow Table 5 may have indicated that "pants" could occur alone or in the front portion of a compound while the information in Shadow Table 5 relative to "cuff" may have indicated that it could occur alone or in the last portion of a compound. Accordingly, while "cuffpants" would have verified using the Compound Parsing Algorithm 2, Word Decode Algorithm 3, and Dictionary 4, the information contained in the Shadow Table 5 indicates the unsuitability of compounding "cuff" and "pants" in this manner, and therefore, the Compound Parsing Algorithm 2 would not verify "cuffpants" to the Text Editor 1.

Now consider verification of "snakeskin". The two substrings returned from the Word Decode Algorithm 3 to the Compound Parsing Algorithm 2 (starting at the beginning of the word) are "snakes" and "snake". The remainder of the word following the longest substring is then sent back to the Word Decode Algorithm 3 for comparison with the word in Dictionary 4. In this case, "kin" is found in Dictionary 4. However, the information in Shadow Table 5 relative to "snakes" and "kin" indicates that, while "snakes" is suitable for use alone or at the front of a compound word, "kin" is also suitable for use either alone or at the front of a compound word. Accordingly, the Compound Parsing Algorithm 2 cannot verify this combination of substrings as a compound word. Thus, the remainder of the word following the next longest substring is compared with the words in Dictionary 4. The next longest substring is "snake" so the remainder following this next longest substring is "skin". This is found in Dictionary 4 and the Shadow Table 5 information relative to "skin" indicates that it may be used alone, at the front, or at the end of a compound word. The Compound Parsing Algorithm 2 can then verify "snakeskin" to the Text Editor 1 as a correctly spelled word.

Figure 2:
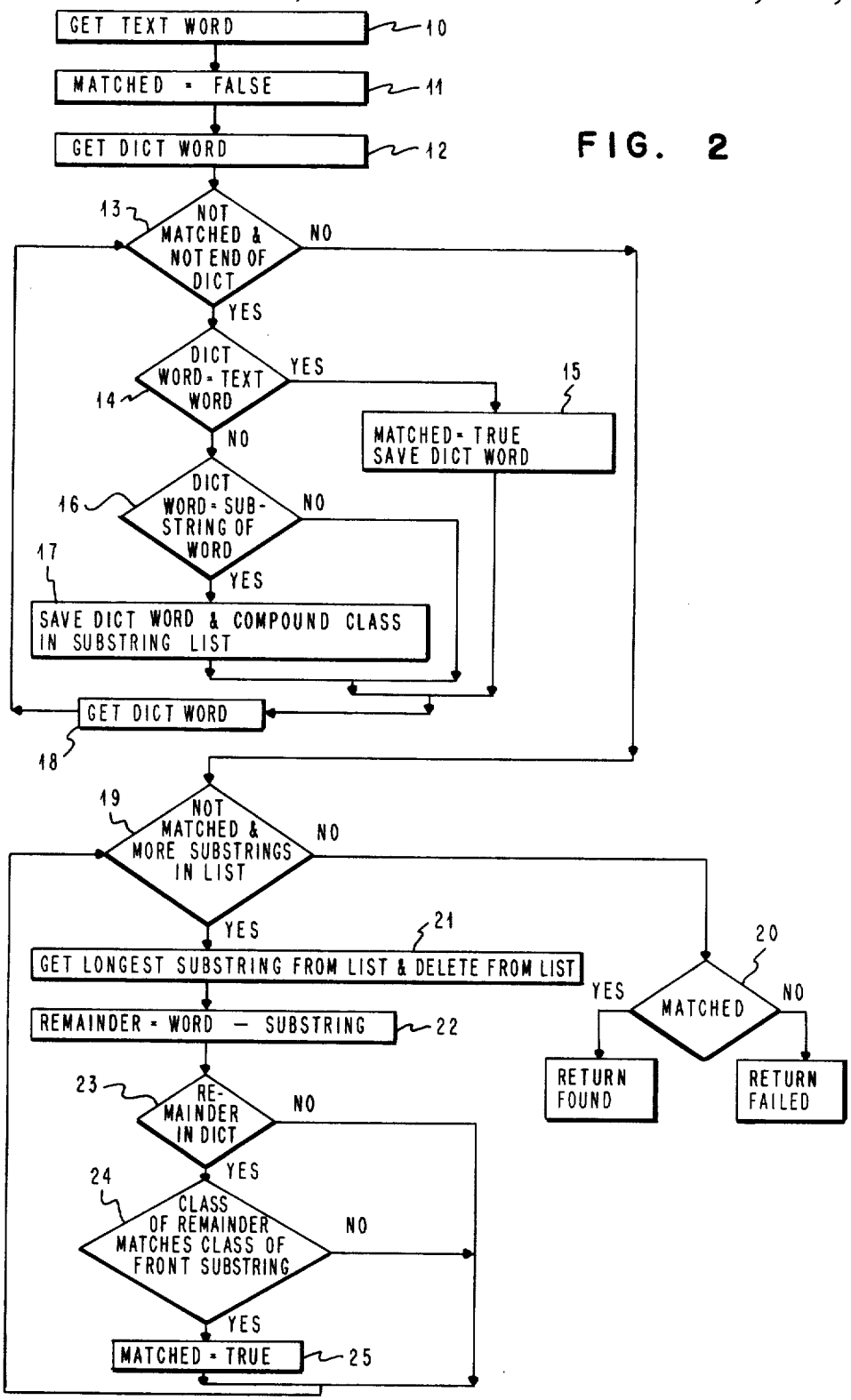
FIG. 2 is a detailed flow chart of the compound word spelling verification technique of this invention.

The detailed flow chart of the compound word spelling verification technique of this invention is shown in FIG. 2. The first step of this technique is to get a text word for verification as indicated at 10. Assume now that verification is being attempted for the compound word "overtime".

The flow chart of FIG. 2 has two major loops: A "look-up" loop and a "compound parsing" loop. Considering first the look-up loop, this loop compares dictionary entries to the input word. Dictionary entries which are substrings of the input word are "remembered" in a list. Before entering the look-up loop, a flag "matched", indicated at block 11, indicates whether the text word matches a dictionary entry. The "matched" flag is set to false to indicate that the text word has not yet been found in the dictionary. Next, the first relevant dictionary entry from the dictionary is accessed at 12. The first relevant word might be, for example, the first word in the dictionary beginning with the same alphabetic letter as the text word to be verified. To obtain greater speed at the expense of possible false alarms, the first relevant word to be accessed might be the first word beginning with the first three letters of the text word to be verified. In any case, if there are no more relevant words in the dictionary to access, the flag "end of dict" (end of dictionary) is set equal to true, instead. For example, if the first three letters of the input word are used to determine a relevant portion of the dictionary, the "end of dict" flag would be set when no more words with the same first three letters could be found in the dictionary.

Continuing in the look-up loop, if the "matched" or "end of dict" is set to true at this point, the word has been found in the dictionary or there were no more words in the dictionary to compare. The look-up loop is thus complete. Otherwise, the process continues, as it ordinarily would in the early stages of verification that have been described thus far.

Continuing in the look-up loop, at 14 the dictionary word most recently accessed is compared with the text word. If they are the same, and the input word is suitable for standing alone (as will be described below in detail), the "matched" flag is set to true and this dictionary word is saved as indicated at 15. However, assuming that this first dictionary word accessed is not the text word to be verified, the operation proceeds to 16 where a test is performed to determine if the dictionary word is a substring of the text word. If so, the dictionary word is saved in a list of substrings of the text word, as indicated at 17. Also saved at 17 along with the substring is the "compound class" from the shadow table which indicates the suitability for compounding and the position in a compound word (if the substring is suitable) that the substring can take. As noted above relative to FIG. 1, this shadow table information can be encoded in a minimum number of bits, as will be understood by those skilled in the art, to denote that the dictionary word can be used: (a) alone only and, therefore, not compoundable, (b) alone or as the front or middle of a compound word, (c) alone or anywhere in a compound word, (d) alone or as the back of a compound word, (e) only as the beginning or middle of a compound word, or (f) only as the back of a compound word.

Thereafter, at 18 the next dictionary word in the dictionary is accessed and the test and comparisons of blocks 13, 14 and 16 continue while any dictionary words found to be substrings of the input text word are saved at 17.

Continuing with the example of attempting to verify "overtime", while assuming that the entire word "overtime" is not in the dictionary, the words "over" and "overt" are saved in the substring list. In this case, the look-up loop would eventually be exited out of block 13 as a result of reaching the end of the relevant portion of the dictionary. When the program exits this look-up loop, there is a list of substrings which entries may be the first component in a compound word. In other cases in which the program exits this loop because the entire input text word was found in the dictionary, the word is presumed to be correctly spelled and no further processing takes place. In a case in which there is no match and also no list of possible compound components, the word is considered to be misspelled.

Returning to the case of verifying the word "overtime", the compound parsing loop is entered because there was no match but there is a list of possible compound components. The compound parsing loop looks at the list of possible components, also referred to as first elements, and attempts to find another dictionary entry such that the two may be joined to form the input text word. Accordingly, at 19 if the pair of conditions: "matched" equals false and substrings in the list, do not both exist, the operation proceeds to block 20. If "matched" equals true, the word is considered verified, whereas if "matched" equals false, the word is considered misspelled because, in this case, there are no substrings in the list from which to continue attempting verification.

At block 19, if "matched" equals false and there are substrings in the list, the operation proceeds to 21 wherein the longest substring from the list is accessed and deleted from the list. Continuing with the example of "overtime" the longest substring is "overt". The remainder or second element of the word "overtime" is then processed at 22 to be "ime", based on the definition of the second element being the input text word "overtime" minus the just accessed longest substring "overt". Next, another look-up loop indicated at 23, 24, and 25 is entered to determine if the remainder "ime" is in the dictionary. This look-up loop, as in the look-up loop described above, consists of looking at all relevant dictionary stems and setting a flag at 25 if the remainder "ime" matches a dictionary word, and the suitability for compounding at the "remainder" position in the input word is appropriate, as indicated by the shadow table information stored with each dictionary word.

If the remainder portion of the input text word matches a word in the dictionary and it is suitable for compounding in this "remainder" portion of a compound word, the input text word is considered a correctly spelled compound word made up of two correctly spelled dictionary entries, suitable for compounding in the order appearing in the input text word. The flag "matched" is set to true. The operation returns to block 19 and proceeds to 20 for "matched" equals true.

Continuing with the example of "overtime" at block 23, the remainder "ime" would not have been found in the dictionary. Thus, the operation would have returned to block 19 and proceeded to 21. In this case, "over" is now the longest substring in the list, and at 22 the remainder is now "time". Then, at 23 "time" will be found in the dictionary and "matched" will be set to true at 25 in this loop. Thus, the input text word "overtime" will be verified on the basis that "over" and "time" are both found in the dictionary and are suitable for compounding in this manner. For compounds consisting of more than two constituent words, the entire process may be applied recursively to the remainder.

As another example of the usefulness of the shadow table information, consider "sunglasses" as the input word. The look-up loop might not find "sunglasses" in the dictionary, but the words "sun" and "sung" would be found as the substrings beginning at the start of the input word. These would be stored, along with their compound class markers from the shadow table, in the substring list. In the compound parsing loop, "sung" would first be taken from the input word, leaving "lasses". Since "sung" is not a word which compounds with other words, its compound class marker from the shadow table would designate it as a "does not compound". This marker is not compatible with any compound class marker, so the process continues by choosing the next longest substring "sun".

"Sun" is taken from "sunglasses" to give "glasses" as a candidate "remainder" or rear portion of the compound word. "Glasses" will be found in the dictionary. Since "sun" is known to be the front element of many compounds (sunlight, sunshine, sunspot, etc.) its compound class marker designates it as a word that may be used alone or at the front of a compound word. Since "glasses" is known to be the rear element of some compounds (e.g., spyglasses) its compound class marker designates it as a known rear compound portion. Since the compound class markers are compatible in well formed compounds, the word is considered to be correctly spelled and the matched flag would be set.

A program design language listing is shown below which also describes this compound word spelling verification technique of this invention. This listing parallels the operation described above relative to the flow chart of FIG. 2.

```
FOR (all words in text)
{ get text word;
matched = FALSE;
get dictionary word;
WHILE (NOT matched) AND (NOT end of dictionary)
{ IF (text word = dictionary word AND compound
flag is suitable)
THEN matched = TRUE;
ELSE IF (dictionary word is a front
substring of text word AND
compound flag is suitable)
THEN save dictionary word and its
compound class in substring list;
get next dictionary word;
}
WHILE (NOT matched) AND (more substrings in list)
{ extract longest front substring from list;
back substring = text word —front substring;
IF (back substring is in dictionary)
THEN
IF (class of back half complements class
of front substring)
THEN matched = TRUE;
}
IF (matched)
THEN return(found);
ELSE return(failed);
}
```

While the invention has been shown and described with reference to particular embodiments thereof, it will be understood by those skilled in the art that the foregoing and other changes in form and details may be made therein without departing from the spirit and scope of the invention. This process is independent of the specific methods of storage, organization, or access or any other particulars of the dictionary. Further while the description of the application of this invention has been in the context of a parsing technique in which the longest initial substring and remainder (with back-up to shorter initial substrings and longer remainders) are utilized, it will be understood by those skilled in the art that this invention may be used in other spelling verification contexts, and is not to be limited by the context in which it is described herein.

We claim:

1. In a computer system including a dictionary against which text words are compared for spelling verification, a method of verifying the spelling of an input text word which word is not stored in said dictionary, comprising:
   storing flags associated with words stored in said dictionary indicative of whether said words may participate in compounding and, for those words which may participate in compounding, the relative positions said words may occupy in a compound word;
   determining that said text word to be verified consists entirely of two or more particular words in said dictionary; and
   returning a verify signal if the flags associated with said particular words are compatible with compounding in the relative positions in which said words occur in said text word.

2. In the method of claim 1 further comprising:
   returning a not verify signal if said flags associated with said particular words indicate incompatibility with compounding said particular words in the relative positions in which they occur in said text word.

3. In the method of claim 2 wherein a type of said flag indicates that a dictionary word associated therewith is not compoundable.

4. In a method of claim 2 wherein a type of said flag indicates that a dictionary word associated therewith can be used alone or as the front or middle of a compound word.

5. In the method of claim 2 wherein a type of said flag indicates that a dictionary word associated therewith can be used alone or anywhere in a compound word.

6. In the method of claim 2 wherein a type of said flag indicates that a dictionary word associated therewith can be used alone or as the back of a compound word.

7. In the method of claim 2 wherein a type of said flag indicates that a dictionary word associated therewith can be used only as the beginning or middle of a compound word.

8. In the method of claim 2 wherein a dictionary word associated therewith can be used only as the back of a compound word.

9. In a computer system including a dictionary against which text words are compared for spelling verification, a method of verifying the spelling of an input text word which word is not stored in said dictionary, comprising:
   storing flags associated with words stored in said dictionary indicative of whether said words may participate in compounding and, for those words which may participate in compounding, the relative positions said words may occupy in a compound word;
   identifying an initial substring of said text word which has one of said flags associated therewith indicative of compatibility with compounding said dictionary word at the front of a compound word;
   determining a first remainder of said text word which consists of that portion of said text word succeeding said dictionary word;
   comparing said first remainder with said dictionary; and
   signaling that text word is correctly spelled if said first remainder is found in said dictionary and has a flag associated therewith indicative that said remainder may participate in compounding at the back of said compound word.

* * * * *